Oct. 9, 1962   I. S. BRUMAGIM   3,057,646
ROTARY SEAL WITH COOLING MEANS
Filed Dec. 23, 1959   4 Sheets-Sheet 3

INVENTOR
IVAN S. BRUMAGIM
BY Harold T. Stowell
Harold L. Stowell
ATTORNEYS.

Oct. 9, 1962     I. S. BRUMAGIM     3,057,646
ROTARY SEAL WITH COOLING MEANS

Filed Dec. 23, 1959     4 Sheets-Sheet 4

INVENTOR
IVAN S. BRUMAGIM

BY Harold T. Stowell
Harold L. Stowell
ATTORNEYS

United States Patent Office 3,057,646
Patented Oct. 9, 1962

3,057,646
ROTARY SEAL WITH COOLING MEANS
Ivan Stanley Brumagim, 109 E. 5th Ave., Warren, Pa.
Filed Dec. 23, 1959, Ser. No. 861,636
7 Claims. (Cl. 285—41)

The present invention relates to mechanical seals and, more particularly, to a rotary seal for adjacent ends of abutting relatively rotating pipes.

It is a primary object of the invention to produce a fluid-tight mechanical seal between the abutting ends of relatively rotating pipes.

Another object of the invention is to produce a seal for relatively rotating pipes which is simple in construction and easily maintained.

Still another object of the invention is to produce a seal for relatively rotating pipes capable of handling high pressure and high temperature fluids wherein a fluid coolant is circulated about the seal to effect a heat transfer from the sealing elements and also to aid in achieving the desired sealing.

These and other objects and advantages of the invention may be achieved by an embodiment of the invention which may typically comprise a first peripheral flange member secured to one of a pair of abutting pipes, a second peripheral flange member secured to the other of said pair of pipes, a first set of abutting annular sealing members maintained between the first and second flange members, a second set of abutting annular sealing members maintained between the first and second flange members, the second set of sealing members being radially aligned with the first set of sealing members and concentrically spaced therefrom, and means for maintaining a flow of cooling liquid under pressure in the annular space between the first and second sets of annular sealing members.

The seal of the present invention has application in coupling a fixed pipe or conduit to a relatively rotating pipe or conduit which conducts heating or cooling medium to rotary kilns, dryers, or other similar equipment.

Figure 1:
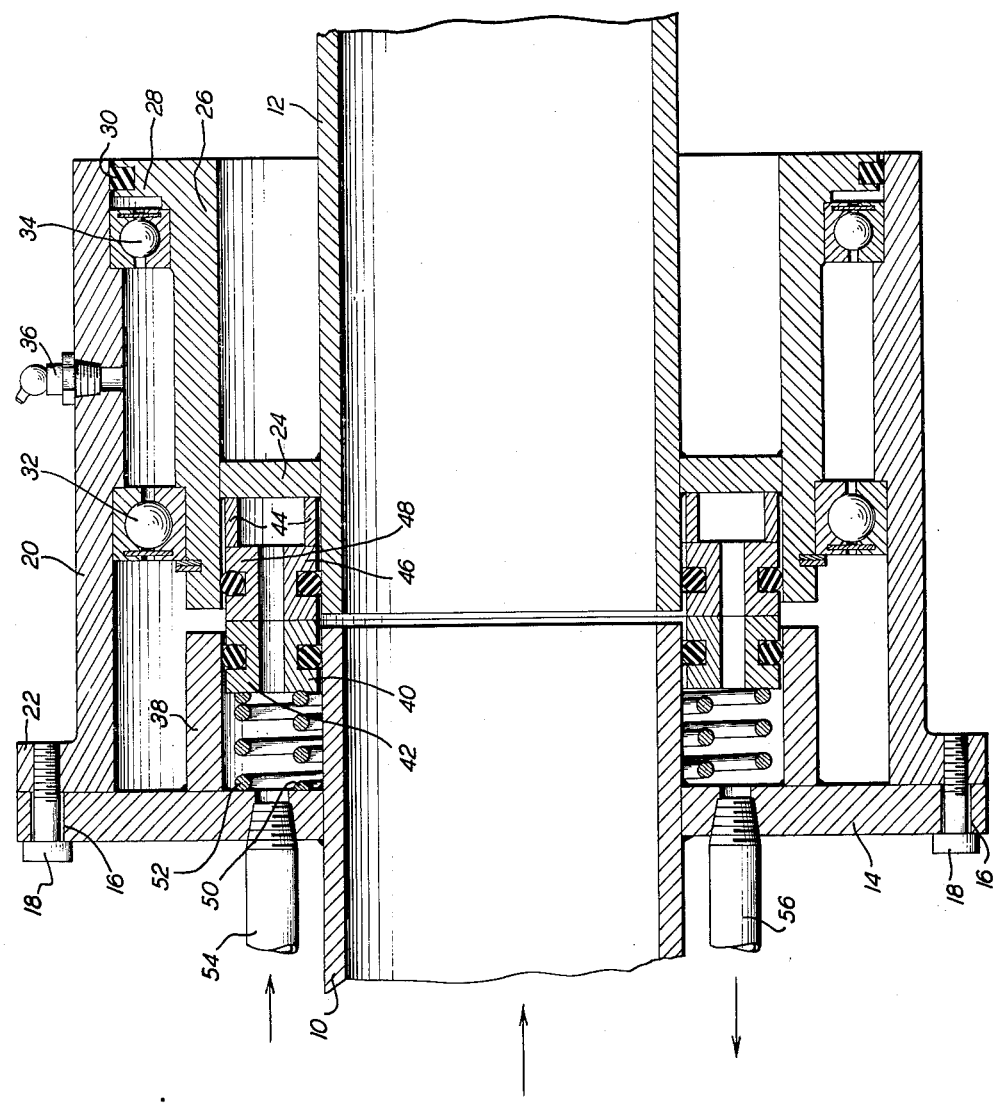
FIGURE 1 is a longitudinal sectional view of the seal construction embodying the principles of the invention.

Referring to FIGURE 1, reference numeral 10 indicates a fixed pipe through which a high temperature, high pressure, liquid is introduced into a relatively rotating pipe 12 of a rotary kiln, for example. The prime object of the invention is to provide a fluid-tight seal between the abutting ends of these relatively rotating pipes. To this end, the fixed pipe 10 is provided with a radially extending annular plate 14 suitably secured thereto in any of the well-known manners, such as welding. The outer peripheral edge of the plate 14 is provided with apertures 16 adapted to receive threaded fasteners 18.

An annular wall 20 having an outwardly extending flanged portion 22 is disposed concentrically about the longitudinal axis of the pipes 10 and 12 and is maintained in a fixed position with respect to the pipe 10 being tightly secured to the plate 14 by means of threaded fasteners 18.

A radially outwardly extending flange 24 is secured to the outer surface of the rotating pipe 12 and supports at its outermost extremity an annular wall 26 which is of less diameter than and concentric with the outer wall 20. The wall 26 is provided with an outwardly extending peripheral boss portion 28 in which an annular channel is formed to receive a sealing means 30, such as conventional packing, to effect a grease-tight seal between adjacent portions of the outer wall 20 and the boss portion 28 of the inner wall 26, while permitting relative rotation therebetween.

To insure proper axial alignment and to facilitate the relative rotational movement between the pipes 10 and 12, there is provided a pair of spaced bearing assemblies 32 and 34. A lubricating fitting 36 is provided in the outer wall 20 to enable a lubricant to be introduced into the space between the bearing assemblies 32 and 34 and permit the bearing assemblies 32 and 34 to be effectively lubricated. The bearing assemblies 32 and 34 are of the type provided with seals which allow the bearing elements to move and are effective to prevent the lubricant from escaping to other portions of the seal structure. It will be noted that due to the novel seal structure, the bearing assemblies 32 and 34 are disposed remote from the pipe 12. Since the pipe 12, in certain applications, may conduct high temperature, high pressure fluids, it is advantageous to mount these bearings in a manner so that they will not be harmed by the deleterious effects of the high temperatures of the transient fluids in the associated pipes.

An annular rib element 38 of substantially the same diameter as the inner wall 26 is secured to the side of the plate 14 and defines a chamber with the outer wall of the fixed pipe 10 which chamber is adapted to receive a pair of concentrically arranged stator rings 40 and 42. Each of these rings is provided with an O-ring to effect a tight seal between the ring and its associated adjacent wall.

A chamber similar to that defined by the annular rib 38 and the pipe 10 is formed between the outer surface of the rotating pipe 12 and the inner wall 26 by means of flange 24. Spacer rings 44 are disposed within the chamber and are adapted to maintain the desired disposition of a pair of concentrically arranged rotor rings 46 and 48. Each of these rotor rings is provided with an O-ring to effect a seal between its associated ring and the adjacent wall of the system.

A pair of concentrically arranged helical spring elements 50 and 52 is disposed within the chamber defined by the annular rib 38 and the outer surface of the pipe 10 between the side wall of the plate 14 and the stator rings 40 and 42. The spring elements 50 and 52 are effective to urge the stator rings 40 and 42, respectively, into snug engagement with their corresponding rotor rings 46 and 48, respectively.

It will be appreciated that the engaging surfaces of the stator and rotor rings are finished to substantially perfect flatness to insure a good seal therebetween. In certain embodiments of the invention, it has been found advantageous to employ a hard surface material, such as, for example, tungsten carbide, stellite, or ceramic for the rotor rings 46, 48 while the stator rings 40 and 42 may suitably be fabricated from bronze or carbon.

The plate 14 is further provided with coolant inlet and outlet conduits 54 and 56, respectively. The coolant introduced into the system through the inlet conduit 54 is adapted to flow through the chamber housing the helical spring elements 50, 52 and the stator rings 40, 42 and through the annular space or zone between the stator rings 40 and 42 and the rotor rings 46 and 48 and then is allowed to escape through the outlet conduit 56. As will be explained in more detail hereinafter, the liquid coolant is an effective heat transfer medium capable of conducting heat away from the seal structure and also functions to lubricate the faces of the sealing rings and to supplement the seal effected between the sealing rings.

In the operation of the system of the invention, the pipe 10 and its associated elements of the sealing mechanism including the plate 14, the annular wall 20, the annular rib 38, and the stator rings 40 and 42 are maintained stationary. The pipe 10 is in communication with a source of high temperature, high pressure fluid which in certain applications may be of the order of 700° F. or more. The pipe 12 and its associated elements including the radial plate 24, the inner wall 26, the spacer ring 44, and the rotor rings 46 and 48 are adapted to rotate with an associated rotary drying mechanism, for example, not shown.

As mentioned hereinbefore, the prime objective of the invention is to permit relative rotary motion between the pipes 10 and 12 while at the same time maintaining a fluid-tight seal between the abutting ends of these pipes. To this end, an efficient seal is effected between the engaging surfaces of the associated rings 40 and 46 and is maintained by the action of the helical spring 50 which constantly forces the stator ring 40 against the rotor ring 46.

In order to supplement the seal effected by the engaging surfaces of the rings 40 and 46, a cooling and sealing liquid is circulated through the system after being introduced into the system through the inlet conduit 54 at a pressure slightly greater than the pressure of the transient fluid within the pipes 10, 12. In this manner, any tendency of the hot fluid to escape between the abutting ends of the pipes 10, 12 will be overcome by the pressure of the coolant acting in an opposite direction. Further, it will be seen that in the event of loss of pressure in the circulating system permitting the transient fluid to flow between the rings 40 and 46 it would be carried out of the chamber through the outlet conduit 56. The stator ring 46 is urged against the rotor ring 48 by the spring 52 to thereby maintain the coolant within the desired portions of the bearing assemblies 32 and 34.

Figure 2:
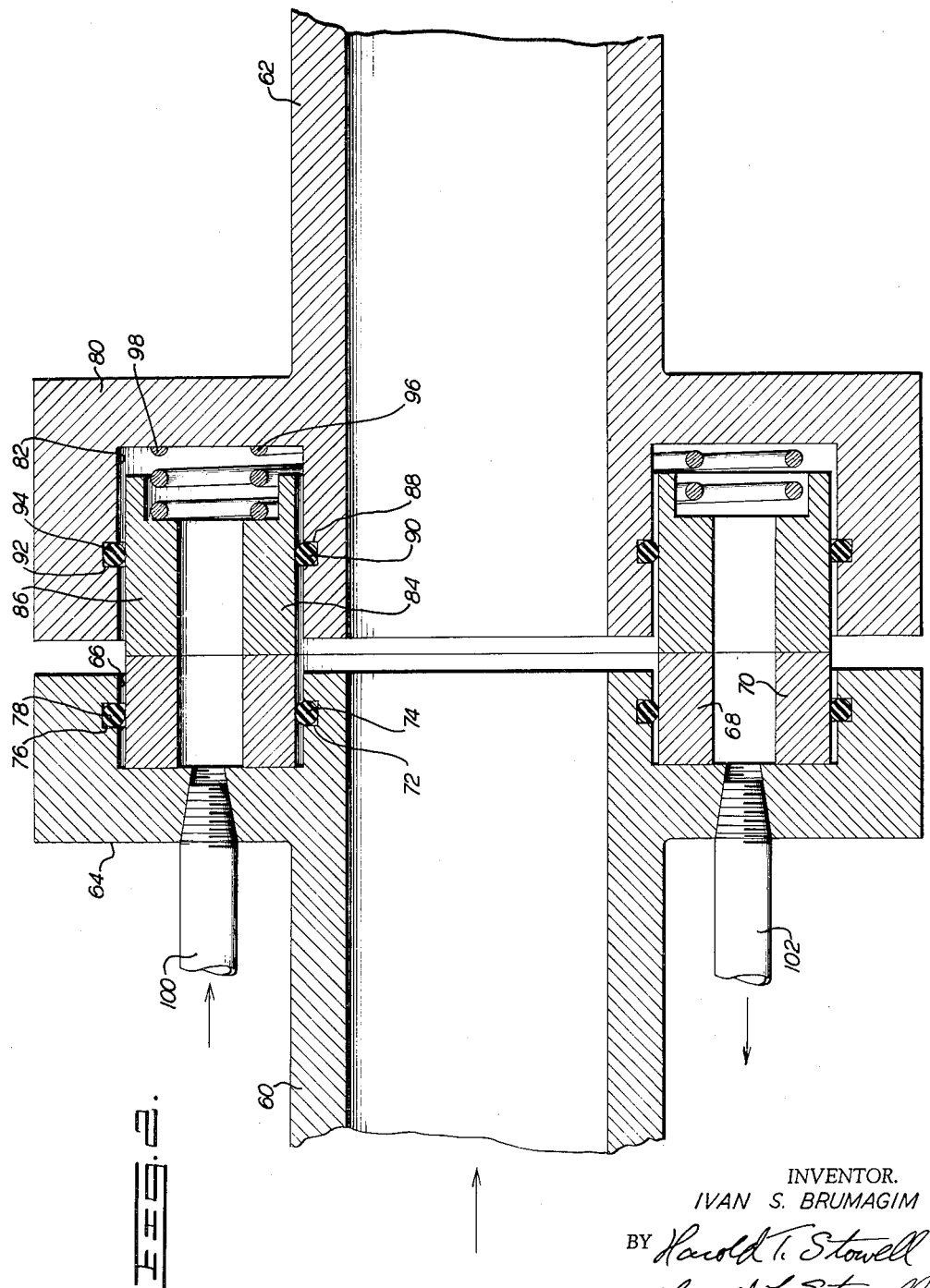
FIGURE 2 is a longitudinal sectional view of a modified form of the invention.

A modified form of the invention is illustrated in FIGURE 2 where there is shown a fixed pipe or conduit 60 and a relatively rotating pipe or conduit 62. The pipe 60 is provided with an annular radially outwardly extending flanged portion 64 having an annular channel 66 formed in the vertical wall thereof. A pair of concentric stator rings 68 and 70 of different diameters are disposed within the channel 66.

An annular recess 72 is formed in one of the side walls of the channel 66 to receive an O-ring which is adapted to effect a seal between the inner peripheral surface of the stator ring 68 and the wall of the channel 66. Another annular recess 76 is formed in the opposite wall of the channel 66 to receive an O-ring 78 which is adapted to effect a seal between the outer peripheral surface of the stator ring 70 and the wall of the channel 66.

The rotating pipe 62 is provided with an annular radially outwardly extending flanged portion 80, similar to the corresponding portion 64 of the fixed pipe 60. The flanged portion 80 has an annular channel 82 formed in the vertical end wall thereof and is adapted to receive a pair of concentrically arranged rotor rings 84 and 86.

An annular recess 88 is formed in one of the side walls of the channel 82 to receive an O-ring 90 which is adapted to effect a seal between the inner peripheral surface of the rotor ring 84 and the wall of the channel 82. Another annular recess 92 is formed in the opposite wall of the channel 82 to receive an O-ring 94 which is adapted to effect a seal between the outer peripheral surface of the rotor ring 86 and the wall of the channel 82.

There is also disposed within the channel 82 a pair of helical spring members 96 and 98 which are adapted to urge their associated rotor rings 84 and 86, respectively, into snug engagement with the corresponding stator rings 68 and 70, respectively.

The flanged portion 64 of the fixed pipe 60 is further provided with a fluid inlet 100 and a fluid outlet 102 which are disposed 180° apart.

As in the embodiment illustrated in FIGURE 1, the stator rings 68 and 70 may be formed of a bronze or carbon material while the rotor rings 84 and 86 may be formed of a hard surfaced material, such as, for example, tungsten carbide. The engaging surfaces of the rings are finished to substantially perfect flatness to insure a good seal therebetween.

In operation, the high temperature, high pressure fluid which is caused to flow through the relatively rotating pipes 60 and 62 is prevented from flowing out of the abutting ends of these pipes by the sealing action of the stator ring 68 and the rotor ring 84 and their associated O-rings 74 and 90, respectively.

A liquid coolant, which is introduced into the system through the inlet conduit 100 and allowed to leave the seal through the outlet 102, is at a higher pressure than the fluid in the pipes 60 and 62 and thereby acts to supplement the sealing effect of the stator ring 68 and the rotor ring 84. In the event of loss of pressure in the circulating system permitting any of the hot liquid to seep between the engaging surfaces of the rings 68 and 84, it will be conducted away from the seal with the circulating coolant through the outlet conduit 102.

Figure 3:
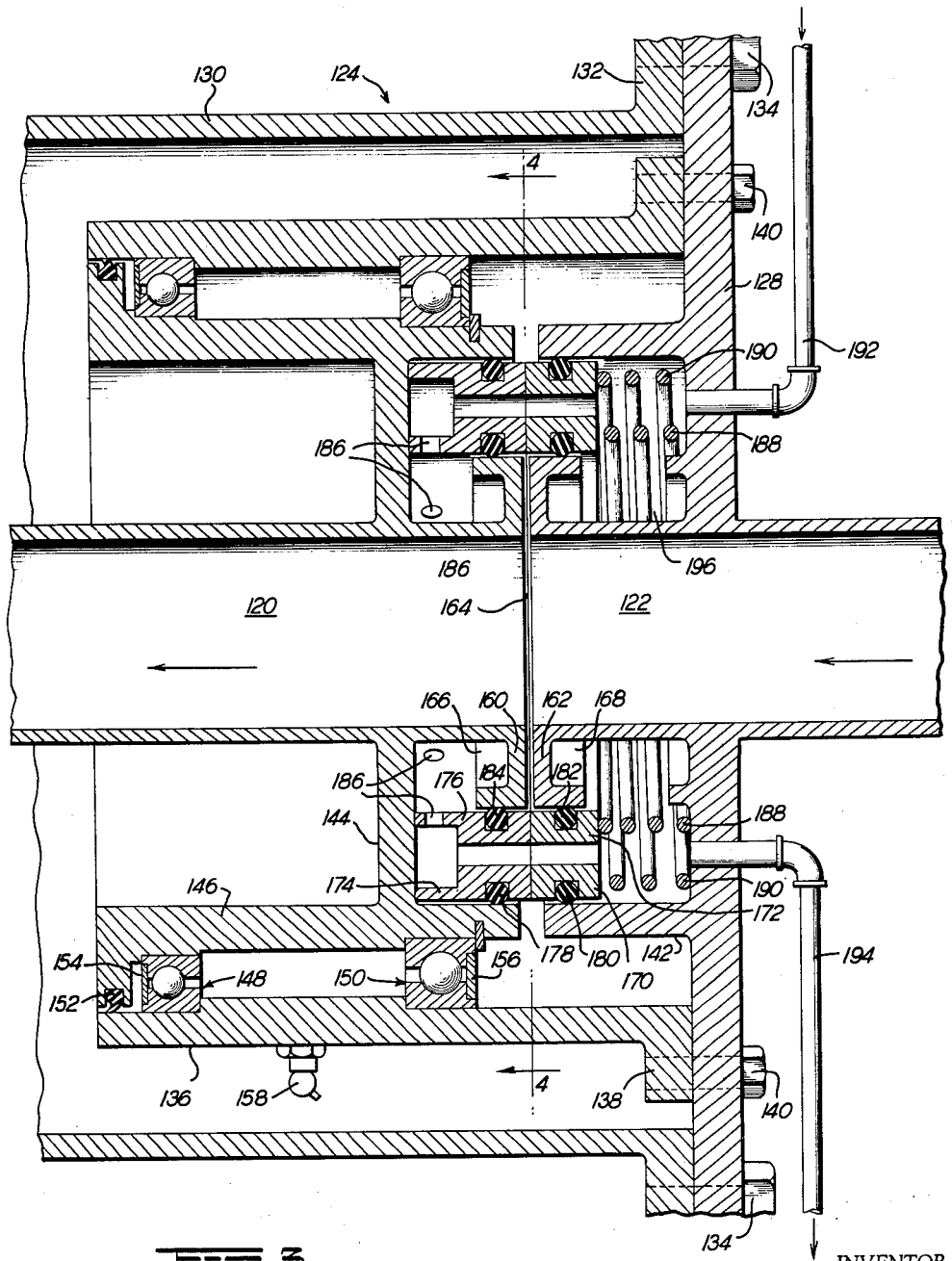
FIGURE 3 is a longitudinal sectional view of a modified form of the invention having improved cooling means for the sealing elements.
Figure 4:
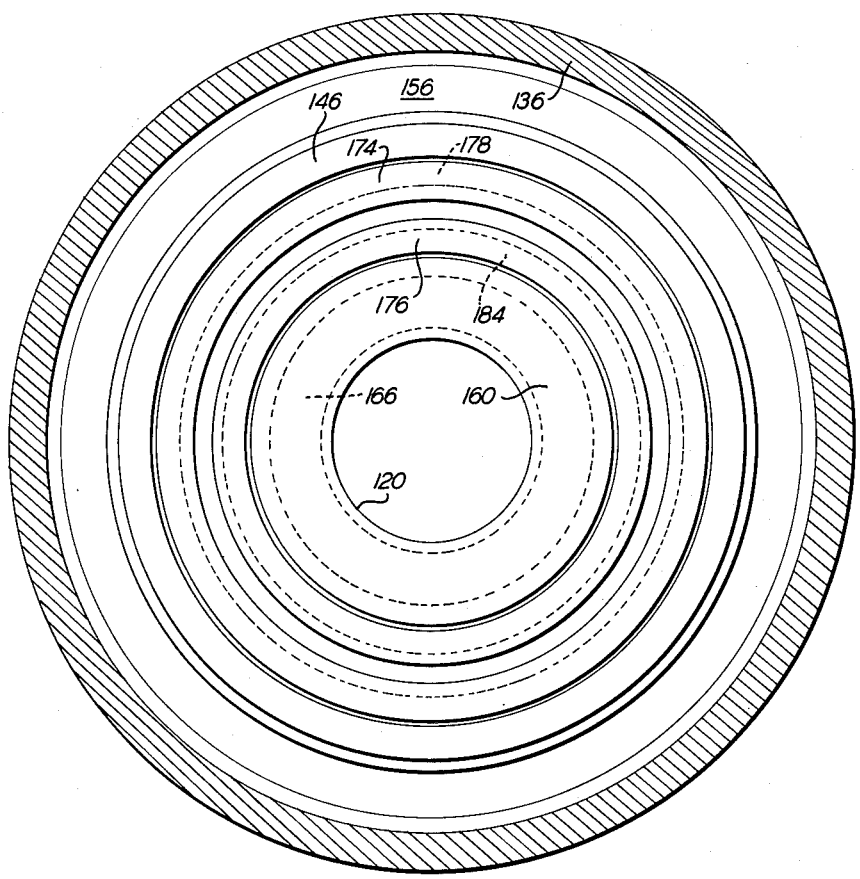
FIGURE 4 is a section substantially on line 4—4 of FIGURE 3.

The liquid coolant is maintained within the desired portion of the seal by the aforementioned structure of the stator ring 68 and the rotor ring 84 and, additionally, the stator ring 70 and the rotor ring 86 and their associated O-rings 78 and 94, respectively.

Where the liquors passing through pipes having the rotary seal of the present invention are at temperatures substantially above 500° F., the stator and rotor sealing surfaces and, particularly, the O-ring seals thereof must be adequately protected from such high temperatures by spacing the pair of sets of sealing members from the outer surfaces of the pipe elements carrying the heated liquors. Referring to FIGURES 3 and 4, there is illustrated a modified form of the present invention particularly adapted for use where the liquors flowing through the pipes are at high temperatures and particulalry temperatures above 500° F.

In FIGURES 3 and 4, 120 and 122 are a pair of relatively rotating pipes interconnected for relative rotative movement by the improved rotary seal generally designated 124. The stationary pipe 122 has fixed adjacent end 126 a radially extending annular plate 128. The plate 128 is suitably secured to the pipe section 122 as hereinbefore described with reference to the forms of the invention shown in FIGURES 1 and 2. The outer peripheral edge of the plate 128 receives an annular sleeve 130 provided with a flange portion 132 which is maintained in a fixed position with respect to the pipe 122 by a plurality of bolt means 134. The annular flange 130 provides an external shield for the rotary seal.

Concentrically inwardly spaced from the annular wall 130 is a further annular wall 136 having a flange portion 138 at one end which flange portion is maintained in fixed position with respect to the pipe 122 and the plate member 128 by the plurality of bolts 140. Annular plate 128 also carries a further annular wall member 142 concentrically spaced inwardly of walls 130 and 136. The axial length of annular wall 142 is, as illustrated in the drawings, slightly less than the axial space between the annular plate 128 and the end 126 of pipe 122.

Rotary pipe 120 is provided with a radially outwardly extending flange member 144 which supports at its most outward extremity an annular wall 146. Annular wall 146 is radially aligned with annular wall 142 carried by plate member 128.

Between the outer surface of annular wall 146 and the inner surface of annular wall 136 is maintained a pair of spaced bearing assemblies 148 and 150, together with suitable lubricant seals 152, 154 and 156. Further, annular wall 136 is provided with a conventional lubricant fitting 158 positioned between the spaced bearing assemblies 148 and 150.

Each of the pipes 120 and 122 is also provided with a radially extending outwardly projecting flange 160 and 162, respectively. The flanges 160 and 162 are positioned adjacent the respective ends 164 of pipe 120 and 126 of pipe 122. The outer surfaces of each of the flanges 160 and 162 is provided with an annular portion 166 and 168, respectively.

Between the outer surfaces of annular portions 166 and 168 and the inner surfaces of annular walls 146 and 142 are maintained the sets of annular concentric rotor and stator sealing rings. The pair of annular concentrically spaced stator rings are designated 170 and 172 while the corresponding rotor sealing rings are designated 174 and 176. Rotor ring 174 is provided with an annular recess which receives O-ring 178 to provide a fluid seal between the outer surface of the ring and the inner surface of the annular wall portion 146. Similarly, the corresponding stator ring 170 is provided with an annular recess receiving O-ring 180. The other pair of opposed stator and rotor rings are provided with O-ring seals 182 and 184 which provide liquid seals between the innermost sealing rings 172 and 176 and the annular portions 168 and 166 of the rotary seal.

The innermost rotary seal 176 is provided with a plurality of openings generally designated 186 which provide for the passage of cooling liquid therethrough as to be more fully described hereinafter.

The rotary seal assembly also includes a pair of concentrically arranged helical spring elements 188 and 190 disposed between the plate member 128 and the cooperating stator rings 170 and 172 and urge the stator rings into snug engagement with their corresponding rotor rings 174 and 176, respectively.

The plate member 128 is also provided with coolant inlet and coolant outlet conduits 192 and 194, respectively. The inlet conduit 192 is connected to a source of cooling liquid while conduit 194 is connected to a drain, sump or heat exchange device as well known in the art.

Cooling medium flowing through conduit 192 passes about the helical springs 188 and 190 and into the chamber 196, through the annular space between stator rings 170 and 172 into the space between annular rotor rings 174 and 176, through the openings 186 and into the space between the innermost rotor ring 176 and the outer wall of pipe 120. The return flow of coolant is out of the conduit 194. It will be particularly noted that through the application of the radially outwardly extending flange portions 160 and 162 with their attached annular portions 166 and 168 the sealing rings are radially spaced from the walls of the pipes 120 and 122 whereby the O-ring seals 182 and 184 and the ring members 172 and 176 may be maintained relatively cool with respect to the hot liquors flowing through the pipes 120 and 122 by the circulation of the cooling medium in the space defined between the outer walls of said pipes and the inner walls of annular wall members 142 and 146. With this arrangement, substantially higher temperature liquors may be circulated through the rotary seal without failure of the seal elements and liquors at temperatures of 1600° F. have been successfully handled with this form of the present invention.

It will be particularly noted with respect to this form of the invention that as the radial length of the flanges 160 and 162 is increased, the distance between the source of heat, passing through pipes 120 and 122 and the sealing elements 182, 184, 172 and 176 increases, as does the size of the cooling chambers for these seals thereby providing greater protection from heat for the seals. Thus the radial length of the flanges 160 and 162 for different installations may be different depending on the temperature range of the material to be transported by the pipes 120 and 122.

In view of the above description, it is considered to be relatively apparent that the invention has provided a simple, effective and safe seal between a pair of relatively rotating pipes, primarily because of the provision of a pressure tight mechanically sealed chamber surrounding the junction of said pipes, in which (a) the sealing liquid may be maintained at a temperature satisfactory for good lubrication of the sealing faces; (b) the sealing liquid may be circulated in such quantity to remove both the heat of friction of the sealing faces and the heat conducted from the transient liquid in the pipes thereby preventing scoring of the seal faces and burning of the seal elements; (c) the pressure of the sealing liquid is greater than the transient liquid so that leakage or movement of liquid across the seal faces must be that of the sealing liquid rather than the transient liquid; (d) a failure of the seal faces adjacent to the transient liquid would be immediately detected by loss of pressure of the sealing liquid; (e) in case of failure of seal faces adjacent to the transient liquid the leakage would be only into the sealing chamber and associated system, and not to the atmosphere.

This application is a continuation-in-part of my application Serial No. 760,242 filed September 10, 1958, and now abandoned.

I claim:

1. A rotary seal for abutting ends of relatively rotating pipe comprising a first peripheral flange member secured to one of a pair of abutting pipes, a second peripheral flange member secured to the other of said pair of pipes, a first set of axially aligned sealing rings between said first and second flange members, said first set of rings being radially outwardly spaced from the outer surface of said pipes to provide a first cooling chamber between the outer surfaces of said pipes and the inner surfaces of said first set of sealing rings, a second set of axially aligned sealing rings between the first and second flange members, said second set of rings being radially aligned with said first set of rings and concentrically radially outwardly spaced therefrom to provide a second cooling chamber between the outer surfaces of the said first set of sealing rings and the inner surfaces of said second set of sealing rings, port means between the first and second cooling chambers, springs means urging the rings of said first and second sets of rings into sealing engagement, spaced inlet and outlet means in one of said flanges adjacent the first and second sets of sealing rings, and conduit means connecting said inlet means to a source of cooling liquid under pressure to flow said liquid through said first and second cooling chambers, and further sealing means cooperating with said first and second sets of sealing rings confining the flow of cooling liquid to said first and second cooling chambers.

2. A rotary seal for abutting ends of relatively rotating pipes comprising a first peripheral flange member secured to one of a pair of abutting pipes, a second peripheral flange member secured to the other of said pair of pipes cooperating with said first flange member to define a chamber therebetween, a first set of abutting annular sealing members disposed within the chamber and maintained between said first and second flange members, means for sealing the outer surface of each of the members of said first set of annular sealing members with a surface of said first and second flange member respectively, a second set of abutting annular sealing members disposed within the chamber and maintained between said first and second flange members, means for sealing the inner surface of each of the members of said second set of annular sealing members with the outer surface of respective ones of said rotating pipes, said second set of sealing members being radially aligned with said first set of annular sealing members and concentrically spaced therefrom, said first and said second set of annular sealing members being disposed to define an annular fluid passage therebetween, and means for maintaining a flow of liquid under pressure in the annular passage between said first and said second set of annular sealing members including a fluid pressure inlet and a fluid pressure outlet communicating with the annular space between said first set and said second set of annular sealing members.

3. A rotary seal for abutting ends of relatively rotating pipes comprising a first peripheral flange member secured to one of a pair of abutting pipes, a second peripheral flange member secured to the other of said pair of pipes cooperating with said first peripheral flange member defining a chamber therebetween, a first set of axially aligned sealing rings disposed within the chamber between said first and second flange members, means for sealing the outer surface of each of the sealing rings of said first set with a surface of said first and said second flange members respectively, a second set of axially aligned sealing rings disposed within the chamber between said first and second flange members, means for sealing the inner surface of each of the sealing rings of said second set with the outer surface of respective ones of said rotating pipes, said second set of sealing rings being radially aligned with said first set of sealing rings and concentrically spaced therefrom, said first and said second set of annular sealing rings being disposed to define an annular fluid passage therebetween, spring means urging the sealing rings of said first and second sets of rings into sealing engagement, and means maintaining a flow of fluid under pressure in the annular space between said first and second sets of sealing rings including a fluid pressure inlet and a fluid pressure outlet communicating with the annular space between said first set and said second set of sealing rings.

4. The invention defined in claim 3 wherein each set of sealing rings comprises a metal ring and a carbon ring.

5. A rotary seal for abutting ends of relatively rotating pipes comprising a first peripheral flange member secured to one pair of abutting pipes, a second peripheral flange member secured to the other of said pair of pipes cooperating with said first flange to define a chamber therebetween, bearing means between said first and second flange members, a first set of axially aligned sealing rings disposed within said chamber between said first and second flange members, means for sealing the outer surface of each of the rings of said first set of sealing rings with a surface of said first and second flange members respectively, a second set of axially aligned sealing rings disposed within the chamber between said first and second flange members, means for sealing the inner surface of each of said rings with the outer surface of the respective ones of said rotating pipes, said second set of rings being radially aligned with said first set of rings and concentrically spaced therefrom, said first and second set of sealing rings being disposed to define an annular fluid passage therebetween, spring means for urging the rings of said first and second sets of rings into sealing engagement, and means maintaining a flow of liquid under pressure in the annular space between said first and said second sets of sealing rings including a fluid pressure inlet and a fluid pressure outlet communicating with the annular space between said first set and said second set of sealing rings.

6. The invention defined in claim 5 wherein said bearing means comprise a pair of axially spaced anti-friction bearings.

7. A rotary seal for abutting ends of relatively rotating pipes comprising a first peripheral flange member secured to one of a pair of abutting pipes, a second peripheral flange member secured to the other of said pair of pipes cooperating with said first flange to define a chamber therebetween, a first set of axially aligned sealing rings between said first and second flange members, means for sealing the outer surface of each of the first set of annular sealing rings with a surface of said first and said second flange members respectively, a second set of axially aligned sealing rings within the chamber between said first and second flange members, means for sealing the inner surface of each of the axially aligned sealing rings of the second set with the outer surface of respective ones of said rotating pipes, said second set of rings being radially aligned with said first set of rings and concentrically spaced therefrom, said first and said second set of annular sealing rings being disposed to define a fluid passage therebetween, spring means for urging the rings of said first and said second sets of rings into sealing engagement, a fluid pressure inlet and a fluid pressure outlet communicating with the annular space between said first set and said second set of sealing rings, and conduit means connecting said fluid pressure inlet means to a source of fluid under pressure.

References Cited in the file of this patent
UNITED STATES PATENTS

| 2,462,006 | Schmitter et al. | Feb. 15, 1949 |
| 2,628,852 | Voytech | Feb. 17, 1953 |
| 2,910,309 | Snyder et al. | Oct. 27, 1959 |